US011039222B2

(12) United States Patent
Grover

(10) Patent No.: US 11,039,222 B2
(45) Date of Patent: *Jun. 15, 2021

(54) TARGETED CONTENT PLACEMENT USING OVERLAYS

(71) Applicant: Roku, Inc., San Jose, CA (US)

(72) Inventor: Matthew Grover, Draper, UT (US)

(73) Assignee: Roku, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/704,356

(22) Filed: Dec. 5, 2019

(65) Prior Publication Data

US 2020/0107082 A1 Apr. 2, 2020

Related U.S. Application Data

(63) Continuation of application No. 15/938,167, filed on Mar. 28, 2018, now Pat. No. 10,542,326.

(Continued)

(51) Int. Cl.
*H04N 21/81* (2011.01)
*H04N 21/8358* (2011.01)
(Continued)

(52) U.S. Cl.
CPC ....... *H04N 21/812* (2013.01); *G06K 9/00744* (2013.01); *G06K 9/52* (2013.01);
(Continued)

(58) Field of Classification Search
CPC .......... H04N 21/812; H04N 21/23418; H04N 21/44008; H04N 21/8358;
(Continued)

(56) References Cited

U.S. PATENT DOCUMENTS 8,949,889 B1 2/2015 Erdmann
2004/0194128 A1* 9/2004 McIntyre ............ G11B 27/034
725/32

(Continued)

OTHER PUBLICATIONS

International Preliminary Search Report and Written Opinion for International Application No. PCT/US2018/024756, dated Oct. 10, 2019.

(Continued)

*Primary Examiner* — Cynthia M Fogg
(74) *Attorney, Agent, or Firm* — McDonnell Boehnen Hulbert & Berghoff LLP

(57) ABSTRACT

A method for targeted content placement using overlays includes receiving media content from a content feed and displaying the media content from the content feed at a display of the media device. As the display of the media device displays the media content, the method also includes fingerprinting at least one frame of the media content to obtain a fingerprint and identifying an in-frame advertisement based on the obtained fingerprint. The in-frame advertisement corresponds to an advertisement within a portion of the at least one frame. The method further includes determining a target overlay location within the at least one frame with the in-frame advertisement, the target overlay location corresponding to a size of the in-frame advertisement, and superimposing overlay content at the target overlay location when the display of the media device displays the at least one frame with the in-frame advertisement.

20 Claims, 5 Drawing Sheets

Related U.S. Application Data

(60) Provisional application No. 62/478,196, filed on Mar. 29, 2017.

(51) Int. Cl.
| | |
|---|---|
| *H04N 21/44* | (2011.01) |
| *H04N 21/431* | (2011.01) |
| *H04N 21/234* | (2011.01) |
| *G06Q 30/02* | (2012.01) |
| *G06K 9/00* | (2006.01) |
| *G06K 9/52* | (2006.01) |

(52) U.S. Cl.
CPC ..... *G06Q 30/0241* (2013.01); *G06Q 30/0251* (2013.01); *H04N 21/23418* (2013.01); *H04N 21/4312* (2013.01); *H04N 21/44008* (2013.01); *H04N 21/44016* (2013.01); *H04N 21/8358* (2013.01)

(58) Field of Classification Search
CPC ......... H04N 21/44016; H04N 21/4312; H04N 21/23424; G06K 9/00744; G06K 9/52; G06Q 30/0241; G06Q 30/0251
USPC .......................................................... 725/34
See application file for complete search history.

(56) References Cited

U.S. PATENT DOCUMENTS

| | | |
|---|---|---|
| 2008/0089551 A1 | 4/2008 | Heather et al. |
| 2010/0287580 A1 | 11/2010 | Harding et al. |
| 2011/0063317 A1 | 3/2011 | Gharaat et al. |
| 2011/0321082 A1 | 12/2011 | Weerasinghe |
| 2013/0031579 A1 | 1/2013 | Klappert |
| 2014/0196085 A1 | 7/2014 | Dunker et al. |
| 2016/0234564 A1 | 8/2016 | Holyoak |
| 2017/0150213 A1 | 5/2017 | Cremer et al. |
| 2017/0238037 A1* | 8/2017 | Grover ............. H04N 21/23418 725/19 |
| 2017/0244999 A1 | 8/2017 | Chen |
| 2017/0251247 A1* | 8/2017 | Lee .................... H04N 21/6543 |

OTHER PUBLICATIONS

International Search Report, Application No. PCT/US2018/024756, dated Jun. 14, 2018, 12 pages.

* cited by examiner

TARGETED CONTENT PLACEMENT USING OVERLAYS

CROSS REFERENCE TO RELATED APPLICATIONS

This U.S. patent application is a continuation of, and claims priority to, U.S. patent application Ser. No. 15/938,167, filed on Mar. 28, 2018, which claims priority under 35 U.S.C. § 119(e) to U.S. Provisional Application 62/478,196, filed on Mar. 29, 2017. The disclosures of these prior applications are considered part of the disclosure of this application and are hereby incorporated by reference in their entireties.

TECHNICAL FIELD

This disclosure relates to targeted content placement using overlays.

BACKGROUND

Media devices, such as smart televisions (TVs), may access broadcast media content and receive streaming media. Streaming media refers to a service in which media content may be provided to an end user over a telephone line, cable, Internet, and so forth upon request. For example, a viewer may view a movie without having to leave their residence. Also, a viewer may access various types of educational content, such as video lectures, without having to physically attend at a school or educational institution.

As the number of media devices continues to increase, video content generation and delivery may similarly increase. With an increase in the use of media devices to access streaming media, content or network providers may distribute contextually-relevant material to viewers that are consuming media content. For example, local broadcasters may include contextually-relevant advertisements content with media content.

SUMMARY

One aspect of the disclosure provides a method for targeted content placement using overlays. The method includes receiving, at data processing hardware of a media device, media content from a content feed. The method also includes displaying, by the data processing hardware of the media device, the media content from the content feed at a display of the media device. As the display of the media device displays the media content, the method further includes the following: fingerprinting, by the data processing hardware of the media device, at least one frame of the media content to obtain a fingerprint; identifying, by the data processing hardware of the media device, an in-frame advertisement within the at least one frame based on the obtained fingerprint, the in-frame advertisement corresponding to an advertisement within a portion of the at least one frame; determining, by the data processing hardware of the media device, a target overlay location within the at least one frame with the in-frame advertisement, the target overlay location corresponding to a size of the in-frame advertisement within the at least one frame; and superimposing, by the data processing hardware of the media device, overlay content at the target overlay location when the display of the media device displays the at least one frame with the in-frame advertisement.

Implementations of the disclosure may include one or more of the following optional features. In some implementations, superimposing the overlay content at the target overlay location includes scaling the overlay content to fit the determined target overlay location. The method may also include identifying, by the data processing hardware of the media device, the overlay content based on the obtained fingerprint, the identified overlay content corresponding to an overlay content fingerprint that matches a portion of the obtained fingerprint corresponding to the in-frame advertisement. Optionally, the overlay content may be randomly selected from an overlay content database in communication with the data processing hardware of the media device.

In some examples, fingerprinting the at least one frame of the media content to obtain the fingerprint associates an in-frame advertisement identifier with in-frame advertisements. In this example, the method also includes obtaining, by the data processing hardware of the media device, the overlay content with an overlay identifier that matches the associated in-frame advertisement identifier corresponding to a respective in-frame advertisement. Additionally or alternatively, the in-frame advertisement may include a background feature within the media content of the at least one frame.

In some configurations, the in-frame advertisement corresponds to a scene, the scene corresponding to more than one frame of media content. Here, the method may also include identifying, by the data processing hardware of the media device, overlay content corresponding to an overlay scene, the overlay scene including a number of overlay content frames that matches a number of frames corresponding to the scene of the in-frame advertisement. In other configurations, the in-frame advertisement corresponds to a potential in-frame advertisement placement position within the portion of the at least one frame.

In some examples, the method includes receiving, at the data processing hardware of the media device, an advertisement placement request, the advertisement placement request requesting an in-frame advertisement placement position and including overlay criteria. Here, the method also includes, by the data processing hardware of the media device, identifying the target overlay location as the in-frame advertisement placement position and superimposing overlay content at the in-frame advertisement placement position that satisfies the overlay criteria of the advertisement placement request.

Another aspect of the disclosure provides a system for targeted content placement using overlays. The system includes a media device including a display, data processing hardware located at the media device, and memory hardware in communication with the data processing hardware. The memory hardware stores instructions that when executed on the data processing hardware cause the data processing hardware to perform operations. The operations include receiving media content from a content feed and displaying the media content from the content feed at a display of the media device. As the display of the media device displays the media content, the operations include: fingerprinting at least one frame of the media content to obtain a fingerprint; identifying an in-frame advertisement within the at least one frame based on the obtained fingerprint, the in-frame advertisement corresponding to an advertisement within a portion of the at least one frame; determining a target overlay location within the at least one frame with the in-frame advertisement, the target overlay location corresponding to a size of the in-frame advertisement within the at least one frame; and superimposing overlay content at the target overlay location when the display of the media device displays the at least one frame with the in-frame advertisement.

This aspect may include one or more of the following optional features. In some implementations, superimposing the overlay content at the target overlay location includes scaling the overlay content to fit the determined target overlay location. The operations may also include identifying the overlay content based on the obtained fingerprint, the identified overlay content corresponding to an overlay content fingerprint that matches a portion of the obtained fingerprint corresponding to the in-frame advertisement. Additionally or alternatively, the overlay content may be randomly selected from an overlay content database in communication with the data processing hardware of the media device.

In some examples, fingerprinting the at least one frame of the media content to obtain the fingerprint associates an identifier with in-frame advertisements and the operations include obtaining the overlay content with an overlay identifier that matches the associated identifier corresponding to a respective in-frame advertisement. Optionally, the in-frame advertisement may include a background feature within the media content of the at least one frame.

In some configurations, the in-frame advertisement corresponds to a scene, the scene corresponding to more than one frame of media content. Here, the operations include identifying overlay content corresponding to an overlay scene, the overlay scene including a number of overlay content frames that matches a number of frames corresponding to the scene of the in-frame advertisement. Additionally or alternatively, the in-frame advertisement may correspond to a potential in-frame advertisement placement position within the portion of the at least one frame.

In some implementations, the operations include receiving an advertisement placement request, the advertisement placement request requesting an in-frame advertisement placement position and comprising overlay criteria. In this implementation, the operations also include identifying the target overlay location as the in-frame advertisement placement position and superimposing overlay content at the in-frame advertisement placement position that satisfies the overlay criteria of the advertisement placement request.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
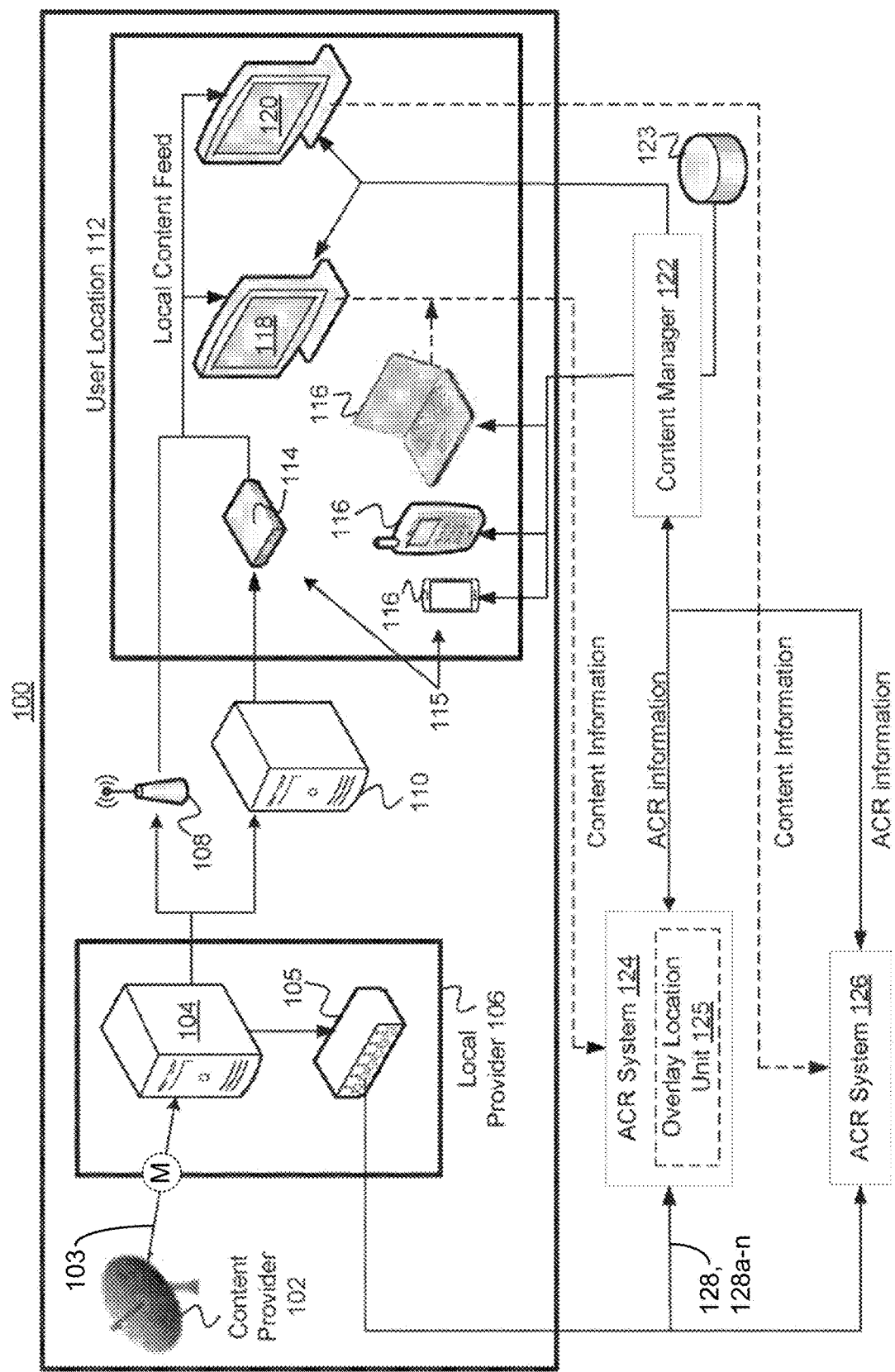
FIG. 1 illustrates a schematic view of an example content distribution network.

Media content broadcasting or streaming are media sources to obtain media content for entertainment, education, news, and other information. Media content broadcasting or streaming, such as television (TV) show broadcasting, can be an engaging venue to advertise products and services or provide information to viewers. Conventionally, media content advertising has been passive advertising. Commercials may be displayed to a viewer during a program at times chosen by the television program producer or distributor, where the media content is fixed at the time of post-production. For example, media content may be filmed and then enter post-production. At post production, the sequence and content of frames in the media content are defined and fixed. Each copy of the media content that is distributed is the same, providing the same viewing experience for each person who views the media content. The same media content is shown to the viewer regardless of the demographics of the viewer, the personal preferences of the viewer, and so forth.

The fixed nature of the media content limits the adaptability of the media content to update or personalize the media content for a viewer. For example, a production studio for media content receives the media content from content providers who generate the featured content, advertisements, trailers, previews, and other content for display. The production studio edits, masters, and prepares the media content and provides the media content to the viewers through a distribution network. The production studio determines what is shown in the media content, including the featured content, advertisements, and so forth.

A significant source of income for the media content providers comes from advertising and promotional sources. Advertisers pay large sums for product placement in order to have their products appear in the media content. Digital Product Placement is where an element is added to or replaced one or more frames of media content during the post-production. In one example, automobile manufacturers pay a premium to have their cars used as part of a set in a movie. In another example, an advertisement may be added to a new film on a poster in the background of a scene. Similarly, soft drink manufacturers pay to have their labels, vending machines, or billboard advertisements shown in the background of a scene or to have an actor wear a T-shirt with their corporate logo in a film. However, the fixed nature of the media content limits media content providers to only deriving the advertising income from the advertisements that are placed in the media content at the time the media content is in production and post-production.

The present disclosure addresses the above-mentioned and other deficiencies by providing a system to superimpose overlay content onto portions of media content. The system may superimpose overlay content onto portions of media content to provide the viewer with media content that is updated or personalized. The updated or personalized overlay content may provide more opportunities for advertisers and content providers with an improved adaptation of overlay content to markets and viewer demographics, for local customization of different types of content, and more engaging media content.

The word "content" may be used to refer to media or multimedia. The word "content" may also be a specific term that means the subject matter of the medium rather than the medium itself. Likewise, the word "media" and some compound words that include "media" (e.g. multimedia, hypermedia) are instead referring to content, rather than to the channel through which the information is delivered to the end user/audience. Media or media content may include graphical representations, such as: videos, films, television shows, commercials, streaming video, and so forth; text; graphics; animations; still images; interactivity content forms; and so forth. An example of a type of content commonly referred to as a type of media is a "motion picture" referred to as "a film." Overlay content may be media content that includes: advertisements, news alerts, announcements, or other information in addition to media content of a content feed that is currently being displayed to viewers.

FIG. 1 illustrates a system diagram of a content distribution network 100 according to one example. In the content distribution network 100, a content provider 102 may broadcast a content feed 103 to a local provider 106. The local provider 106 may include a headend 104 and an automatic content recognition (ACR) fingerprinter server 105. The content feed 103 from the content provider 102 may be received at the headend 104 of the local provider 106.

In various implementations, the headend 104 may generate a local content feed 103 based on the received content feed 103. For example, the headend 104 may be a local affiliate broadcaster receiving a network channel with programming and advertisements from a national or global broadcaster. In one example, the headend 104 can be a source of a broadcast feed prior to the broadcast facility transmitting the broadcast feed. In another example, the headend 104 can be a distribution amplifier. The distribution amplifier can receive a source feed and can create multiple outputs for different devices from the same source feed. The output feeds can be routed to various distribution outlets, such as for broadcast over the air (OTA), delivery to cable providers, delivery to satellite providers, and/or delivery to online streaming providers.

The headend 104 may communicate the local content feed 103 to the ACR fingerprinter server 105, an over-the-air (OTA) broadcaster 108, and/or a multichannel video programming distributor (MVPD) 110. The OTA broadcaster 108 and/or the MVPD 110 may communicate the local content feed 103 to a media device 115. Some examples of the media devices 115 include client devices 118 and 120 (e.g., smart TVs), a set top box 114 that streams provider content to the client devices 118 and 120, as well as other devices 116 (e.g., OTA antenna, satellite dish, and the like) through which the user may stream the local content feed 103.

In one example, the OTA broadcaster 108 may broadcast the local content feed 103 using traditional local television or radio channels. In this example, the client devices 118 and 120 may include antennas (such as TV or radio antennas) and receive the local content feed 103. In another example, the MVPD 110 (such as cable or satellite broadcaster) may communicate the local content feed 103 to a set top box 114. In this example, the set top box 114 may format the content feed 103 for the client devices 118 and 120 and may communicate the formatted content feed 103 to the client devices 118 and 120. The client devices 118 and 120 may include a display device, such as a television screen or a touch screen, to display the local content to a viewer. Various components of the content distribution network 100 may be integrated or coupled to the client devices 118 and 120. For example, a smart television may include the antennas, the set top box 114, and a display device in a single unit.

The ACR fingerprint server 105 may analyze the local content feed 103 and determine fingerprint information (e.g., fingerprints). In one example, the ACR fingerprinter server 105 can be a device that is installed in a broadcast facility. The ACR fingerprinter server 105 can receive a feed from the headend 104. The ACR fingerprinter server 105 can fingerprint the feed and send the fingerprints 128a-n to a cloud-based web service. In some implementations, the ACR fingerprinter server 105 may be installed inside the broadcast facility in order to fingerprint a feed in advance of that feed being delivered to a display device, such as a television (TV).

The ACR fingerprint server 105 may communicate the fingerprints 128a-n to ACR systems 124 and/or 126. The ACR systems 124 and 126 may be different ACR systems selected by device manufacturers, such as smart TV manufacturers.

The ACR fingerprint server 105 may analyze the local content feed 103 and capture fingerprints 128a-n, which may include an ordered sequence of frames from the local content feed 103. The ACR fingerprint server 105 may communicate the fingerprints 128a-n to the ACR systems 124 and/or 126. The ACR systems 124 and 126 may be different ACR systems selected by device manufacturers, such as smart TV manufacturers. In one example, the ACR system 124 or 126 can include processing logic or a processing device to execute instructions or perform processes. In another example, the ACR systems 124 and 126 can be ACR web services for different ACR vendors. The ACR fingerprinter server 105 can enable the use of indexing clients from multiple ACR vendors. For example, different consumer electronics manufacturers (CEMs), such as TV manufactures, can independently select ACR vendors for integration into their electronic devices. To enable ACR-based functionality on a specific CEM's device, an ACR system can index broadcast feeds using ACR vendors CEMs have selected and integrated on that CEM's televisions. One advantage of integrating multiple ACR vendors onto the ACR fingerprinter server 105 can be to enable entities such as advertisers, advertising agencies, and content providers to interface with a single platform and deliver advanced advertising and content experiences to electronic devices from multiple CEMs.

In various implementations, the ACR fingerprint server 105 may format fingerprints 128a-n for the different ACR systems 124 and 126, e.g., that include different types of fingerprinting technology such as different fingerprinting algorithms. The ACR systems 124 and 126 may establish communication connections with the different media devices 115, including the client devices 118 and 120, respectively. The client devices 118 and 120 may communicate fingerprint information to the ACR systems 124 and 126, respectively. When the ACR system 124 or 126 receives ACR fingerprint information from the client devices 118 and/or 120, the ACR system 124 or 126 matches the received fingerprints 128a-n with those generated by the ACR fingerprint server 105 and when a match occurs and the content has been identified, may communicate ACR events to a content manager 122. In some implementations, as described below, the ACR system 124 or 126 may include an overlay location unit 125. The overlay location unit 125 may identify a location in media content to overlay content stored at the content manager 122 or a memory device coupled to the content manager 122. The ACR system 124 or 126 may or may not include the overlay location unit 125. Details regarding the overlay location unit 125 are described below with respect to FIGS. 2 and 3.

In another example, the ACR systems 124 and 126 receives ACR fingerprint information from the client devices 118 and 120 and matches the received fingerprints 128a-n with those generated by the ACR fingerprint server 105. When a match occurs and the content has been identified, the ACR systems 124 and/or 126 may notify the client device 118 or 120 of the ACR events and then the client device 118 or 120 may communicate those ACR events to a content manager 122. Alternatively, or additionally, the ACR systems 124 and/or 126 directly communicates the ACR events to the content manager 122. The ACR fingerprint information may include: a display of advertisements in the local content feed 103 to a viewer, a display of selected or flagged content in the local content feed 103 to a viewer, a change of content channel at the client device 118 or 120, and so forth.

The event information from the different ACR systems 124 and 126 may be generated in different formats and the content manager 122 may normalize the data into a common format before storing the data into a recorded ACR information database 123 (e.g., database 123 for ease of explanation). For example, the content manager 122 may receive disparate data sets from the ACR systems 124 and 126 that include similar but not identical data, such as data with the same content but formatted differently. The content manager 122 may process and reformat the disparate data sets to create a single data model or format (e.g., reformatted data sets) and the reformatted data sets may be populated into the database 123 in the content manager 122. The event information from the ACR systems, which is stored in the database 123, may further include recorded ACR data from information recorded from users viewing behaviors, interests, and specific viewing history of specific media programs.

In some implementations, to normalize disparate data sets from ACR systems 124 and 126, the content manager 122 may cleanse or filter data in the data sets. For example, some data sets may contain fields or data that may be irrelevant to the content manager 122. In this example, the content manager 122 cleanses or filters the irrelevant data (e.g., the data may be removed or ignored). In another example, some data sets include instances of incomplete or incorrect data or data sets and the content manager 122 cleanses or filters the incomplete or incorrect data or data sets. In another implementations, to normalize the disparate data sets from ACR systems 124 and 126, the content manager 122 maps fields of the data sets. For example, when the content manager 122 receives a first data set from the ACR system 124 and a second data set from the ACR system 126, at least some of the data fields of the first data set and the second data set may be common to both the first and second data set. However, the common data fields may be located at different places in the first and second data sets. In this example, the content manager 122 maps the different data fields of the first and second data sets to normalized fields and have the same data fields in the same data field locations in the database 123.

In another example, to normalize disparate data sets from the ACR systems 124 and 126, the content manager 122 derives data from the data sets. For example, data from the ACR systems 124 and/or 126 may not contain all of the fields that are needed to fill the data fields in the database. However, the content manager 122 may use other fields in the data sets from the ACR systems 124 and 126 to derive data for these data fields.

In some examples, the database 123 includes data fields for such as a state in a country field, a designated market area (DMA), and a county and/or city field but the data sets from the ACR systems 124 and 126 may only include zone improvement plan (ZIP) codes. In this example, the content manager 122 uses the ZIP codes to derive data for the fields in the database. In another example, the data set does not contain any geographic location information, but includes an internet protocol (IP) address of the ACR systems 124 and 126. In this example, the content manager 122 uses a geo-IP lookup service to derive the state, DMA, county, city and ZIP code information.

In another example, the database 123 includes demographic fields such as an age field, a gender field, a household income field, and so forth. However, the data sets from the ACR systems 124 and 126 may not include the demographic fields or demographic data. In this example, the ACR systems 124 and 126 provides the content manager 122 with the IP address of the client devices 118 and 120. The content manager 122 may use the IP addresses to determine the demographic data to populate the data fields in the database.

In another example, a field in a first data set from the ACR system 124 includes local time zone information, such as a mountain daylight time (MDT) zone, and a second data set from the ACR system 126 may include information from another time zone, such as a coordinated universal time (UTC) zone. The database may store all data using the UTC and the content manager 122 may convert the local time to UTC before storing the data in the database 123.

In some implementations, the content manager 122 uses the normalized data to generate reports or data (viewing data) about user viewing behavior across different ACR technology vendors and smart TV or other Internet-connected video devices. The content manager 122 and the media devices 115 may include communications interfaces to communicate information, such as overlay content 212 and recorded ACR data, between the media devices 115 and the content manager 122.

In some examples, the communication interface communicates the information using a cellular network and/or a wireless network. In one example, the communications network is a cellular network that may be a third generation partnership project (3GPP) release 8, 9, 10, 11, or 12, long term evolution (LTE), or Institute of Electronics and Electrical Engineers (IEEE) 802.16p, 802.16n, 802.16m-2011, 802.16h-2010, 802.16j-2009, 802.16-2009. In another example, the communications network is a wireless network (such as a network using the Wi-Fi® technology developed by the Wi-Fi Alliance) that may follow an IEEE® standard developed by the Institute of Electrical and Electronics Engineers, Inc., such as the IEEE 802.11-2012, IEEE 802.11ac, or IEEE 802.11ad standards. In yet another example, the communications network is a Bluetooth® connection developed by Bluetooth Special Interest Group (SIG) such as Bluetooth v1.0, Bluetooth v2.0, Bluetooth v3.0, or Bluetooth v4.0. In another embodiment, the communications network may be a Zigbee® connection developed by the ZigBee Alliance such as IEEE 802.15.4-2003 (Zigbee 2003), IEEE 802.15.4-2006 (Zigbee 2006), IEEE 802.15.4-2007 (Zigbee Pro).

In some implementations, the content manager 122 also instructs the media devices 115 to replace portions of the local content feed 103 received from the OTA broadcaster 108 or the MVPD 110 with overlay content 212. Moreover in some examples, the content manager 122 instructs the media devices 115 to overlay or superimpose overlay content 212 onto portions of the local content feed 103. The content manager 122 may aggregate ACR information across multiple ACR systems 124 and 126 and may communicate overlay content 212 to different client devices 118 and 120, where the client devices 118 and 120 may be from different device manufacturers.

The content manager 122 may also establish communication connections with other devices 116 categorized generally as media devices 115. In some examples, the other device 116 communicates with the client devices 118 or 120 and provides an additional screen (e.g., a second screen) to display overlay content 212. For example, the client devices 118 and 120 receives the local content feed 103 from the OTA broadcaster 108 or the MVPD 110 and displays the local content feed 103 to the user. The other devices 116 may also communicate ACR event information to the ACR systems 124 and 126 when an ACR event occurs, as discussed in the preceding paragraphs. When the content manager 122 receives the ACR event information, the content manager 122 may communicate overlay content 212 to the other devices 116.

In some implementations, the client devices 118 and 120 continue to display the local content feed 103 while the other devices 116 display the overlay content 212. In another example, the client devices 118 and 120 and the other devices 116 both display the overlay content 212. In yet another example, the client devices 118 and 120 and the other devices 116 display a portion of the overlay content 212 and a portion of the local content feed 103. The client devices 118 and 120 and the other devices 116 may display different local content feed 103s and/or overlay content 212.

The client devices 118 and 120 and/or the other devices 116 may display the overlay content 212 at the time the overlay content 212 is received. In some examples, the client devices 118 and 120 and/or the other devices 116 delay displaying the overlay content 212 for a threshold period of time. The threshold period of time may be a predefined period of time or the content manager 122 may select a period of time for the client devices 118 and 120 and/or the other devices 116 to delay displaying the overlay content 212.

Figure 2:
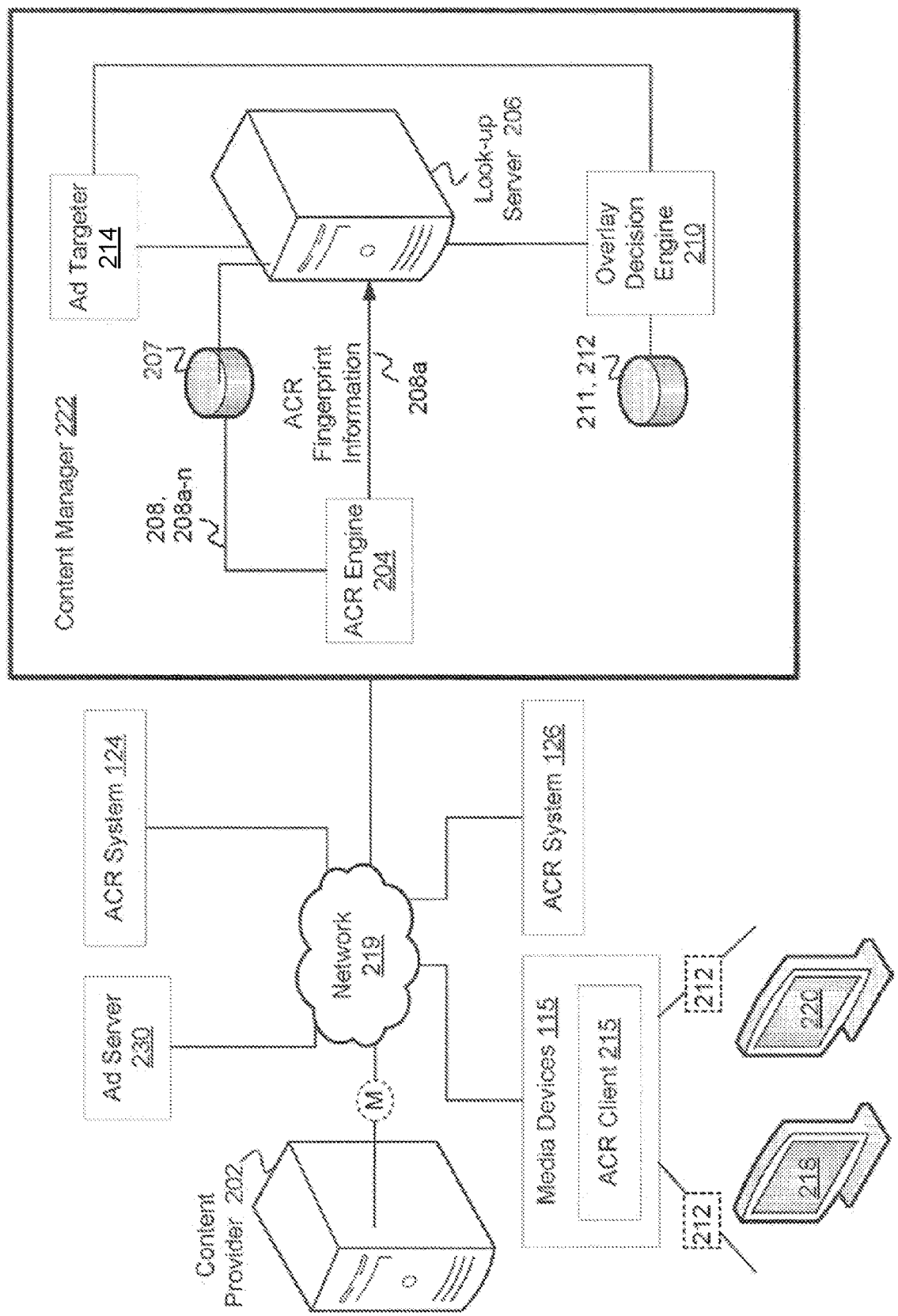
FIG. 2 illustrates a schematic view of an example system that includes a content manager to provide overlay content to a media device such as to client devices.

FIG. 2 illustrates system 200 that includes a content manager 222 to provide overlay content to a media device 115 such as to client devices 218 and/or 220. A content provider 202 (e.g., a television broadcaster) may stream media content M to the media device 115 over a network 219, which streaming may be intercepted by the content manager 222 before or simultaneously with the streaming of the media content M to the media device 115. The content manager 222 may also communicate with an advertisement server (or "ad" server) 230 such as to send the ad server 230 an advertising call that requests an advertisement be served with (or as an overlay to) the media content M to target the subject matter of the media content M and/or interests of a user as will explained in more detail. The ad server 230 may be a third party or external server that provides advertising or other overlay content 212 to the content manager 222 for later delivery to the media devices 115 or may provide the content directly to the media devices 115 for delivery as overlay 212 or replacement advertisements.

The content manager 222 may include an ACR engine 204, a look-up server 206, an overlay decision engine 210, an overlay database 211 in which to store overlay content 212, and an ad targeter 214. The content provider 202 may upload media content M to the ACR engine 204 over the network 219.

The ACR engine 204 may fingerprint the media content M. In some examples, the ACR engine 204 generates fingerprints 208a-n by fingerprinting every frame of a feed, every other frame of the feed, a sequence of frames and so forth. For example, the ACR engine 204 generates a fingerprint 208 for a frame of the feed by performing a discrete cosine transform (DCT) of the frame and designating a subset of the resulting coefficients (e.g., the low-frequency coefficients) as the fingerprint 208. Additionally, or alternatively, the ACR engine 204 may generate (or identify) a target block of fingerprints 208a-n that correspond to an ordered sequence of frames of content being streamed to a media device 115. Furthermore, the look-up server 206 may find a matching source block of frame fingerprints 208a-n stored in a fingerprint database 207 for the originating media programs (e.g., originating content) for which an identity is known.

In another or related implementation, the ACR engine 204 also analyzes ACR event information to determine what event may have occurred, e.g., a positive match between a sequence-of-frames query fingerprint 208a and frame fingerprints 208a-n of originating content stored in the ACR system 124 or 126. In some implementations, the ACR systems 124 and 126 include overlay location units 125. The overlay location unit 125 may identify a location in media content to overlay content stored at the content manager 222 or a memory device coupled to the content manager 222. The ACR system 124 or 126 may or may not include the overlay location unit 125.

When there is a positive match, the ACR engine 204 sends a positive match indicator to the requesting media device 115 that includes a media content identifier (ID) that identifies the content for which a positive match results. The media device 115 may send an overlay request to the overlay decision engine 210 requesting a media content overlay 212. In some examples, the overlay request includes the media content ID. In other examples, the overlay request includes overlay information or overlay parameters.

With further reference to FIG. 2, the ACR engine 204 may communicate fingerprints 208a-n to the look-up server 206, which may look up and determine a television program (e.g., scheduled for an identified channel) and location within the television program corresponding to an ACR event received from the ACR system 124 or 126. Each fingerprint 208 of a segment of the feed may be associated with a time stamp. The time stamp belongs to individual frames of the segment of the feed when received by the ACR engine 204. The time stamp may be a frame number within the feed from an arbitrary starting point. The look-up server 206 stores the fingerprints 208a-n in association with their respective time stamps (e.g., in the fingerprint database 207), and aids the ad targeter 214 and the overlay decision engine 210 in timing and content targeting within the media content M of the feed that the user is viewing.

In some implementations, the ACR engine 204 interacts with an ACR client 215 at various media devices 115. The ACR client 215 may locally match fingerprints 208a-n and confirm whether or not the user has changed a channel to watch a different television program, and to report the channel change to the content manager 222. Accordingly, matching of fingerprints 208a-n may occur locally at the media devices 115 in some cases.

Furthermore, the ACR client 215 may periodically, continuously, or semi-continuously communicate user fingerprint information to the look-up server 206, e.g., in the form of query fingerprints 208a, including target blocks, requesting to confirm the television program or channel being watched on the media device 115. The look-up server 206 may determine when there is a match between the query fingerprint(s) 208a (or target blocks) and a multitude of frame fingerprints 208a-n, which may be stored as source blocks of fingerprints 208a-n in the fingerprints database 207 or across the network 219 from the look-up server. The query fingerprint 208a may be an ordered sequence of frames, respective ones of which may be matched with individual ones of the frame fingerprints 208a-n until finding a sufficient match to be associated with the television program or channel streamed the television program. When there is a positive match, the look-up server 206 communicates a positive match indicator to the ACR client 215. In response to the positive match indicator, the ACR client 215 sends an overlay 212 request to an overlay decision engine 210 requesting a media content overlay 212.

In some examples, the overlay request includes a media content identifier (ID). In additional examples, the overlay request includes overlay information or overlay parameters. For example, the overlay decision engine 210 uses the content ID, overlay information, and/or overlay parameters to identify targeted overlay content 212. In another example, the overlay decision engine 210 may use the content ID, overlay information, and/or overlay parameters to identify an overlay format. The overlay decision engine 210 may compare the content ID, overlay information, and/or overlay parameters with an overlay database 211 to identify the targeted overlay content 212 and the overlay format. The overlay database may be updated, by a content provider or an advertiser (e.g., the ad server 230), with new overlay content 212 and overlay formats on a periodic or continuous basis. The overlay content 212 populates the overlay format (such as an overlay template or the like) before or after being delivered to an overlay position of the streamed media content M of the television program of channel.

The ad targeter 214 tracks and analyzes user interaction with and behavior regarding advertisements and other overlay content 212 delivered to the media devices 115 by the overlay decision engine. The ad targeter 214 may also receive and incorporate user profile information with the analysis of user behavior on a per-media-device basis, to determine subject matter of interest to users. This information and data gathered on a user or group of users may extend to preferred viewing times and typical viewing habits with regards to television programs and the channels typically watched, and when. The ad targeter 214 may then inform the overlay decision engine 210, e.g., in the form of parameters, different subject matters of interest and viewing habits that the overlay decision engine 210 may use in deciding what overlay content 212 to select for delivery to respective users, how to format it and when best to deliver for maximum return on investment of campaign budgets.

When the overlay decision engine 210 identifies the targeted overlay content 212 with the help of the ad targeter 214, the overlay decision engine returns targeted overlay content 212 to the media device 115. In some examples, the overlay decision engine 210 communicates the targeted overlay content 212 directly to the media device 115, such as via a wireless communications network. In other examples, the overlay decision engine 210 communicates the targeted overlay content 212 to the media device 115 via a universal resource locator (URL). When multiple targeted overlay contents 212 match the content ID, overlay information, and/or overlay parameters, the overlay decision engine 210 selects the targeted content overlay that meets a greatest number parameters or other information. Additionally or alternatively, when multiple targeted overlay contents 212 match the content ID, overlay information, and other overlay parameters, the overlay decision engine 210 randomly selects an overlay content 212 that meets the parameters and other information. In further examples, when multiple targeted overlay contents 212 match the content ID, overlay information, and overlay parameters, the overlay decision engine 210 selects predetermined overlay content 212 that matches the content ID, overlay information, and/or overlay parameters. The overlay content 212 may be populated with dynamic content (e.g., content that may be updated or refreshed at periodic intervals). The dynamic content may be stored in a local database or an external system.

The ACR client 215 of the media device 115 may superimpose overlay content 212 over the content feed 103 when the ACR fingerprint information matches the user fingerprint information. In one example, the media device 115 superimposes overlay content 212 over the content feed 103 in a hypertext markup language (HTML) browser. In another example, the media device 115 superimposes overlay content 212 over a content feed 103 from an OTA broadcaster or a cable broadcaster. When the overlay content 212 is placed over the content feed 103, the overlay content 212 may be displayed to the user via a display of the media device 115. In one example, the overlay content 212 includes one or more call-to-action options that may be displayed to a user. In this example, the user interacts with the overlay content 212 using an input device (such as a TV remote, keyboard, a smartphone, or a tablet) to create feedback information. The ACR client 215 may communicate the feedback information to the ad targeter 214. Another individual, such as an advertiser, may access the feedback information and analyze the feedback information to determine desired information, such as user interest in the overlay content 212.

The ACR client 215 may monitor the content feed 103 to determine when the overlay content 212 and content feed 103 match ceases and/or a threshold period of time expires. In one example, when the overlay content 212 and content feed 103 match ceases or a threshold period of time expires, the media device ceases to superimpose the overlay content 212 for display on the media device 115.

Figure 3:
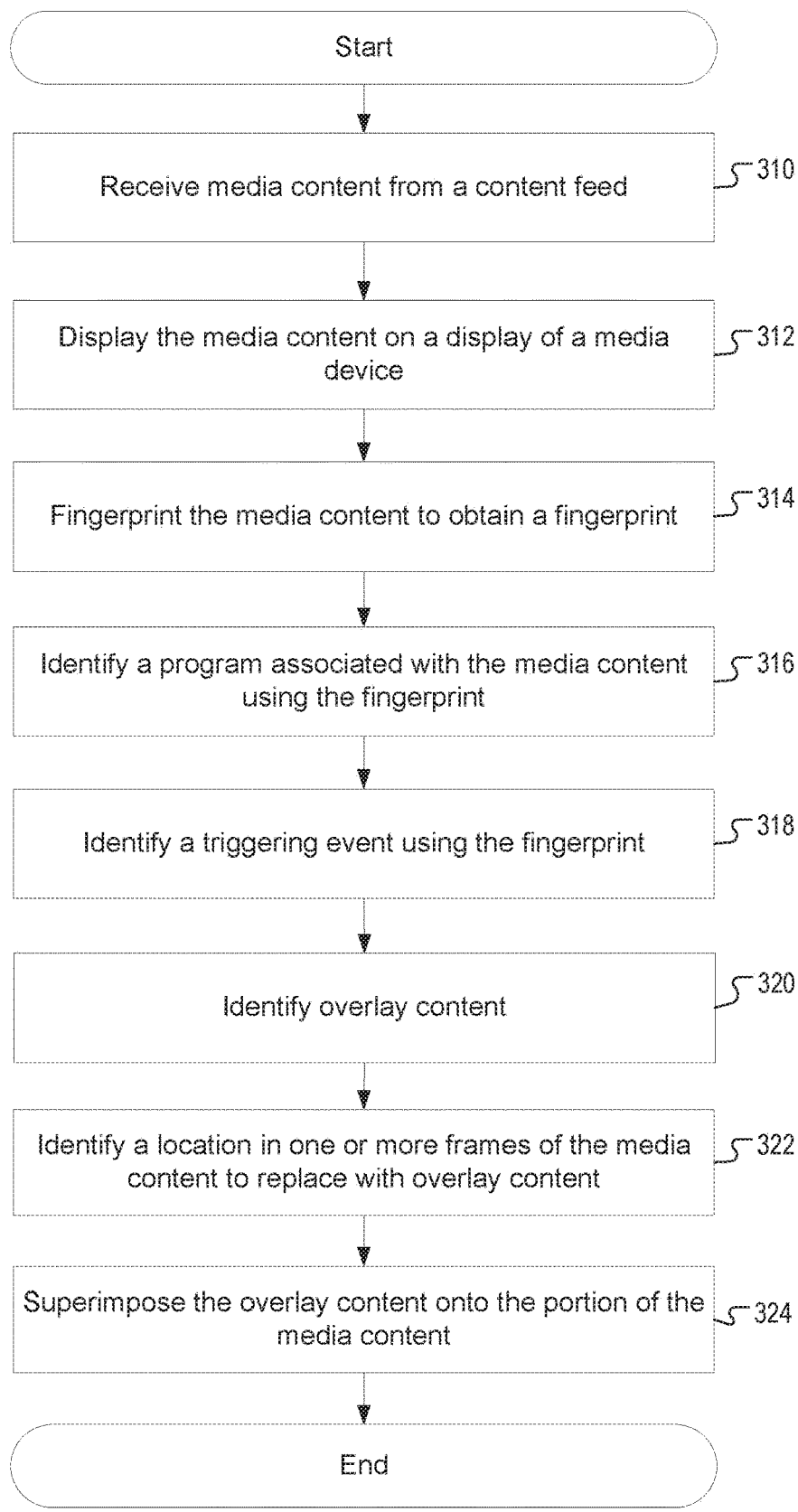
FIG. 3 illustrates an example method for superimposing a portion of media content with overlay content.

FIG. 3 illustrates an example method 300 for superimposing a portion of media content with overlay content. The method 300 may at least partially be performed by processing logic that includes hardware (e.g., circuitry, dedicated logic, a processing component, microcode, etc.), software (e.g., instructions executed by a processing device), firmware or a combination thereof. In some implementations, the method 300 is performed by all or part of the content distribution network 100 of FIG. 1 or the system 200 of FIG. 2. For example, the method 300 is performed by the ACR system 124 or 126 or the media devices 115.

Referring to FIG. 3, the method 300 begins at block 310 with a media device 115 receiving media content M from a content feed 103. At block 312, the method includes the media device 115 displaying the media content M on the media device 115. At block 314, the method includes an ACR system fingerprinting the media content M. At block 316, the method includes the ACR system identifying a program associated with the media content M using the fingerprint 128, 208. At block 318, the method includes identifying a triggering event using the fingerprint 128, 208. In some implementations, the triggering event is the media device 115 displaying the media content M. In other implementations, the triggering event is the media device 115 pausing the displaying of the media content M.

At block 320, the method includes a content manager identifying overlay content 212 to superimpose onto the media content M. In some implementations, the content manager uses the fingerprint 128, 208 to identify overlay content 212 that is associated with the media content M. In another implementation, the content manager may randomly select overlay content 212.

At block 322, an ACR system, in response to the triggering event, identifies a location in one or more frames of the media content M to replace with overlay content 212. In some examples, the ACR system identifies the location in the one or more frames of the media content M using fingerprinting. For example, the ACR system associates an identifier with the portion of the one or more frames or scenes in the media content M to be replaced. The ACR system may also associate the identifier with overlay content 212. The ACR system may determine the fingerprint 128, 208 at frame level accuracy to identify the location in the one or more frames of the media content M to be superimposing with the overlay content 212. For example, where product placement only occurs for a few frames in media content M, the frame level accuracy of fingerprinting enables the media device 115 to superimpose the overlay at a precise time or frame in the media. In some implementations, the media device 115 or the content manager scales the overlay content 212 to fit the identified location in the media content M.

At block 324, the method includes the media device 115 superimposing the overlay content 212 onto a portion of the media content M (e.g., at a location of an in-frame advertisement). For example, the ACR system uses fingerprinting to determine that media content M within the frames includes a portion of the media content M that is to be superimposed with the overlay content 212. In other words, the overlay content 212 may correspond to advertisements that may be substituted for identified in-frame advertisements. In some examples, the ACR system sends the media device 115 a message requesting (e.g., an advertisement placement request) that the media device 115 superimpose the media content M at the location in the one or more frames. The media device 115 may respond to the request by superimposing the overlay content 212 at the identified location in the one or more frames. The overlay content 212 may be superimposed or inserted at spatial positions or temporal positions within frames or sections of the media content M (e.g., at a position of the in-frame advertisement within the media content M). In some examples, an overlay area is selected from multiple predetermined or predefined overlay areas in one or more frames of the media content M.

In some examples, the overlay content 212 is superimposed onto the media content M so as to appear to a viewer that the overlay content 212 was originally part of the media content M. For example, drink cans or bottles are superimposed next to glasses containing the beverage so the drink cans or bottles appear to the viewer that they are being consumed. In other examples, the media device 115 dynamically superimposes the overlay content 212 onto the media content M to add, remove, or modify a portion of the media content M. For example, when an actor in the media content M is using an older generation smartphone in a scene of the media content, the media device 115 superimposes overlay content 212 with the newest generation smartphone at the location of the smartphone in the media content M.

In some examples, a content manager selects the overlay content 212 using overlay criteria. The overlay criteria may be demographic information, location information, environmental information, and so forth that is associated with an individual or household using the media device. For example, the overlay content 212 targets the demographic of the household. The media device 115 may superimpose overlay content 212 onto a poster in a scene of the media content M that is associated with the demographics of the household. In this example, viewers of different households view the same media content M with different overlay content 212 that may be personalized to them. In some implementations, the same product is presented differently when advertised to different viewing audiences. For example, the same breakfast cereal is touted as healthful, full of fiber, low in fat, and nutritious to a health conscious audience and as fun, colorful, sugary, and delightfully crunchy to a less health-conscious audience.

Figure 4A:
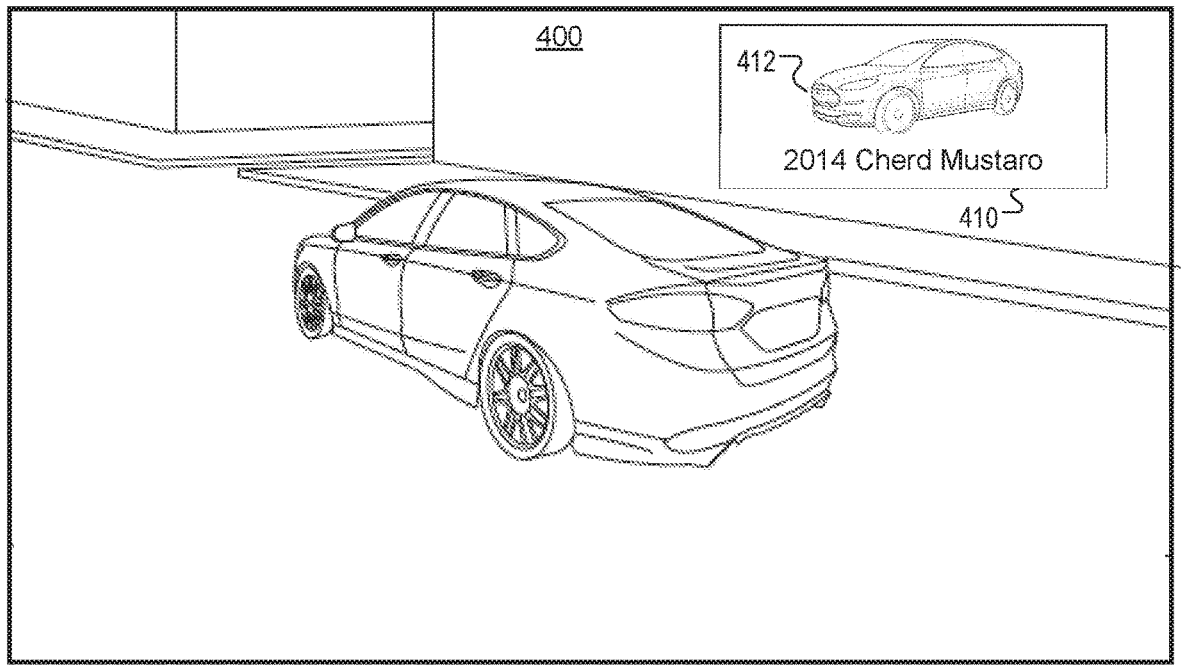
FIG. 4A illustrates a schematic view of example media content that includes an overlay location with media content.

FIG. 4A illustrates an example of media content 400 that includes an overlay location 410 with media content 412 corresponding to a first in-frame advertisement. The overlay location 410 (e.g., of an in-frame advertisement) may be a location in the media content 400 that has been identified as a location to superimpose overlay content, as discussed above. For example, the overlay location 410 corresponds to a background feature within the media content 400. The media content 400 may include the media content 412 that is part of the original media content 400 that may be received from a content provider or broadcaster at a media device.

Figure 4B:
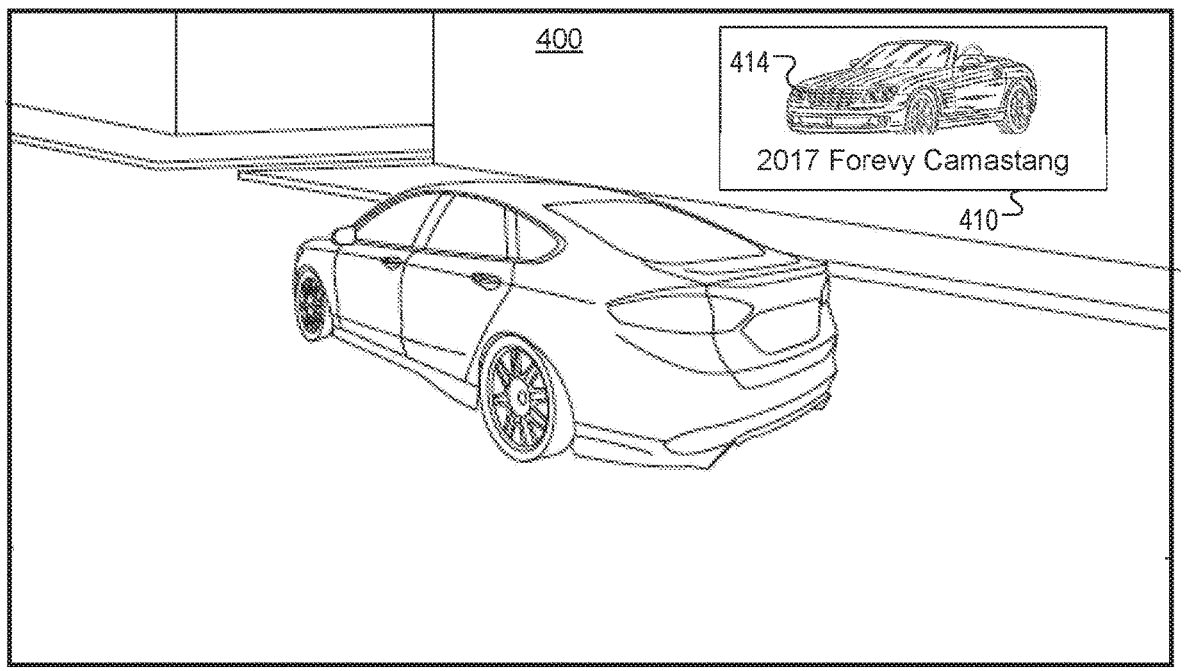
FIG. 4B illustrates a schematic view of example media content that includes an overlay location with overlay content.

FIG. 4B illustrates an example of media content 400 that includes an overlay location 410 with overlay content 414 corresponding to a second in-frame advertisement. Some of the features in FIG. 4B are the same or similar to the some of the features in FIG. 4A as noted by same reference numbers, unless expressly described otherwise. As discussed above, the ACR system 124 or 126 of FIG. 1 may identify the overlay location 410 using fingerprints. Referring to FIG. 4B, a media device 115 receives the overlay content 414 from the content manager 122 of FIG. 1. When a triggering event occurs, a media device 115 superimposes the overlay content 414 onto the media content 400 at the overlay location 410 as the second in-frame advertisement. For example, the media content 400 in FIG. 4A may initially include a first in-frame advertisement within the media content 412 that is an image of a billboard with a 2014 Cherd Mustaro. The media device may superimpose the overlay content 414 with an image of a 2017 Forevy Camastang on top of the 2014 Cherd Mustaro to show a new car advertisement on the billboard as the second in-frame advertisement. The location and size of the overlay location 410 are not intended to be limiting and may vary in view of the media content. The size and content of the overlay content 414 are not intended to be limiting and may vary in view of the media content, overlay criteria, and so forth.

Figure 5:
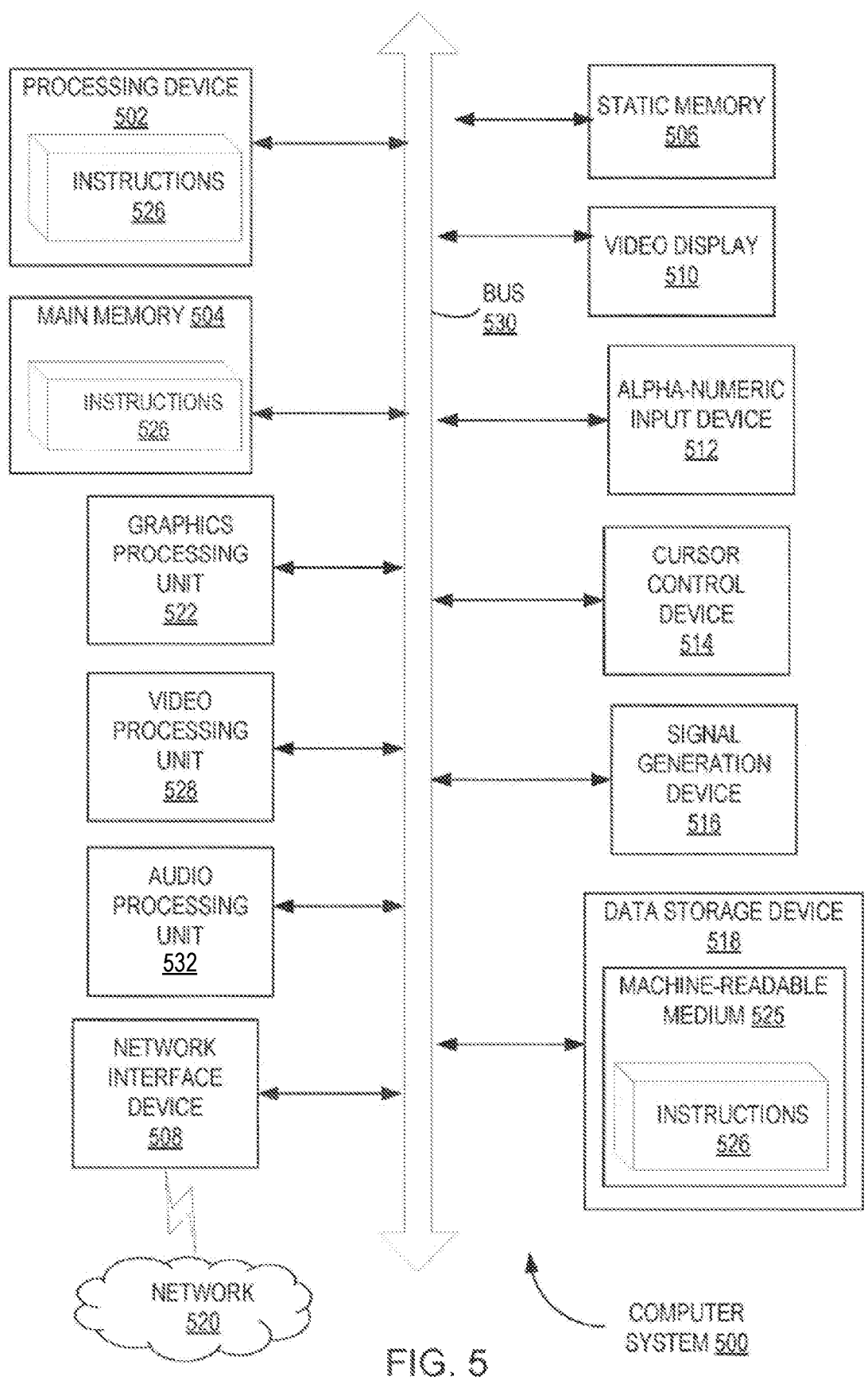
FIG. 5 illustrates a diagrammatic representation of a machine in the example form of a computer system within which a set of instructions, for causing the machine to perform any one or more of the methodologies discussed herein.

FIG. 5 illustrates an example diagrammatic representation of a machine in the example form of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 500 may correspond to the ACR system 124 or 126 of FIG. 1, to the ACR system 224 or 226 of FIGS. 2 and 3, or to the content manager 122 of FIG. 1, the content manager 222 of FIG. 2, or the content manager 322 of FIG. 3. The computer system 500 may correspond to any media device 115 such as the client device 118 or 120 of FIG. 1. The computer system 500 may correspond to at least a portion of a cloud-based computer system.

The computer system 500 includes data processing hardware 502 (e.g., a processing device), memory hardware including main memory 504 (e.g., read-only memory (ROM), flash memory, dynamic random access memory (DRAM) (such as synchronous DRAM (SDRAM) or DRAM (RDRAM), etc.) and static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. In some implementations, processing device 502 may include one or more processing cores. The processing device 502 may execute the instructions 526 of a mirroring logic for performing the operations discussed herein.

The computer system 500 may further include a network interface device 508 communicably coupled to a network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a signal generation device 516 (e.g., a speaker), or other peripheral devices. Furthermore, computer system 500 may include a graphics processing unit 522, a video processing unit 528, and an audio processing unit 532. In another embodiment, the computer system 500 may include a chipset (not illustrated), which refers to a group of integrated circuits, or chips, that are designed to work with the processing device 502 and controls communications between the processing device 502 and external devices. For example, the chipset may be a set of chips on a motherboard that links the processing device 502 to very high-speed devices, such as main memory 504 and graphic controllers, as well as linking the processing device 502 to lower-speed peripheral buses of peripherals, such as USB, PCI or ISA buses.

The data storage device 518 may include a computer-readable storage medium 525 on which is stored instructions 526 embodying any one or more of the methodologies of functions described herein. The instructions 526 may also reside, completely or at least partially, within the main memory 504 and/or within the processing device 502 during execution thereof by the computer system 500; the main memory 504 and the processing device 502 also constituting computer-readable storage media.

The computer-readable storage medium 525 may also be used to store instructions 526 utilizing logic and/or a software library containing methods that call the above applications. While the computer-readable storage medium 525 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions 526 for execution by the machine and that cause the machine to perform any one or more of the methodologies of the present disclosure. The term "computer-readable storage medium" shall accordingly be taken to include, but not be limited to, solid-state memories, optical media, and magnetic media. The following examples pertain to further implementations.

While the present disclosure has been described with respect to a limited number of implementations, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The implementations are described with reference to secure memory repartitioning in specific integrated circuits, such as in computing platforms or microprocessors. The implementations may also be applicable to other types of integrated circuits and programmable logic devices. For example, the disclosed implementations are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below. It is described that the system may be any kind of computer or embedded system. The disclosed implementations may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the implementations of methods, apparatuses, and systems described herein (whether in reference to hardware, firmware, software, or a combination thereof) are vital to a 'green technology' future balanced with performance considerations.

Although the implementations herein are described with reference to a processor, other implementations are applicable to other types of integrated circuits and logic devices. Similar techniques and teachings of implementations of the present disclosure may be applied to other types of circuits or semiconductor devices that may benefit from higher pipeline throughput and improved performance. The teachings of implementations of the present disclosure are applicable to any processor or machine that performs data manipulations. However, the present disclosure is not limited to processors or machines that perform 512 bit, 256 bit, 128 bit, 64 bit, 32 bit, or 16 bit data operations and may be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of implementations of the present disclosure rather than to provide an exhaustive list of all possible implementations of implementations of the present disclosure.

Although the below examples describe instruction handling and distribution in the context of execution units and logic circuits, other implementations of the present disclosure may be accomplished by way of a data or instructions stored on a machine-readable, tangible medium, which when performed by a machine cause the machine to perform functions consistent with at least some implementations of the disclosure. In some implementations, functions associated with implementations of the present disclosure are embodied in machine-executable instructions. The instructions may be used to cause a general-purpose or special-purpose processor that is programmed with the instructions to perform the steps of the present disclosure. Implementations of the present disclosure may be provided as a computer program product or software which may include a machine or computer-readable medium having stored thereon instructions which may be used to program a computer (or other electronic devices) to perform one or more operations according to implementations of the present disclosure. Alternatively, operations of implementations of the present disclosure might be performed by specific hardware components that contain fixed-function logic for performing the operations, or by any combination of programmed computer components and fixed-function hardware components.

Instructions used to program logic to perform implementations of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in some implementations, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as may be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In some implementations, use of the term logic includes hardware, such as transistors, registers, or other hardware, such as programmable logic devices.

Use of the phrase 'configured to,' in some implementations, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in some implementations, refers to some apparatus, logic, hardware, and/or element designed in such a way to enable use of the apparatus, logic, hardware, and/or element in a specified manner. Note as above that use of to, capable to, or operable to, in some implementations, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In some implementations, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in some implementations, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform implementations of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "some implementations" or "an embodiment" means that a particular feature, structure, or characteristic described in connection with the embodiment is included in at least some implementations of the present disclosure. Thus, the appearances of the phrases "in some implementations" or "in an embodiment" in various places throughout this specification are not necessarily all referring to the same embodiment. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct implementations, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "some implementations" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A method comprising:
   receiving, at data processing hardware of a media device, media content from a content feed;
   displaying, by the data processing hardware of the media device, the media content from the content feed at a display of the media device;
   determining, by the data processing hardware of the media device, a target overlay location within at least one frame of the media content;
   determining, by the data processing hardware of the media device, that one or more fingerprints obtained from fingerprinting the at least one frame of the media content match fingerprint data associated with a known identity of the media content;
   while the one or more obtained fingerprints are determined to be matching the fingerprint data associated with the known identity of the media content, superimposing, by the data processing hardware of the media device, overlay content at the target overlay location when the display of the media device displays the at least one frame;
   during superimposing the overlay content at the target overlay location, determining, by the data processing hardware of the media device, that the match between the one or more obtained fingerprints and the fingerprint data associated with the known identity of the media content has ceased; and
   in response to determining that the match between the one or more obtained fingerprints and the fingerprint data associated with the known identity of the media content has ceased, discontinuing, by the data processing hardware of the media device, the superimposing of the overlay content at the target overlay location.

2. The method of claim 1, wherein superimposing the overlay content at the target overlay location further comprises scaling the overlay content to fit the determined target overlay location.

3. The method of claim 1, further comprising:
   identifying, by the data processing hardware of the media device, the overlay content based on the one or more obtained fingerprints, the identified overlay content corresponding to an overlay content fingerprint that matches a portion of the one or more obtained fingerprints.

4. The method of claim 1, wherein the overlay content is randomly selected from an overlay content database in communication with the data processing hardware of the media device.

5. The method of claim 1, further comprising:
   based on the one or more obtained fingerprints, identifying, by the data processing hardware of the media device, an in-frame advertisement within the at least one frame,
   wherein superimposing the overlay content at the target overlay location when the display of the media device displays the at least one frame comprises superimposing the overlay content at the target overlay location when the display of the media device displays the at least one frame with the in-frame advertisement.

6. The method of claim 5, wherein the in-frame advertisement comprises a background feature within the media content of the at least one frame.

7. The method of claim 5, wherein the in-frame advertisement corresponds to a scene, the scene corresponding to more than one frame of media content.

8. The method of claim 7, further comprising:
   identifying, by the data processing hardware of the media device, overlay content corresponding to an overlay scene, the overlay scene comprising a number of overlay content frames that matches a number of frames corresponding to the scene of the in-frame advertisement.

9. The method of claim 5, wherein the in-frame advertisement corresponds to a potential in-frame advertisement placement position within a portion of the at least one frame.

10. The method of claim 5, further comprising:
    receiving, at the data processing hardware of the media device, an advertisement placement request, the advertisement placement request requesting an in-frame advertisement placement position and comprising overlay criteria;
    identifying, by the data processing hardware of the media device, the target overlay location as the in-frame advertisement placement position; and
    superimposing, by the data processing hardware of the media device, overlay content at the in-frame advertisement placement position that satisfies the overlay criteria of the advertisement placement request.

11. A system comprising:
a media device comprising a display;
data processing hardware located at the media device; and
memory hardware in communication with the data processing hardware, the memory hardware storing instructions that when executed on the data processing hardware cause the data processing hardware to perform operations comprising:
receiving media content from a content feed;
displaying the media content from the content feed at the display of the media device; determining a target overlay location within at least one frame of the media content;
determining that one or more fingerprints obtained from fingerprinting the at least one frame of the media content match fingerprint data associated with a known identity of the media content;
while the one or more obtained fingerprints are determined to be matching the fingerprint data associated with the known identity of the media content, superimposing overlay content at the target overlay location when the display of the media device displays the at least one frame;
during superimposing the overlay content at the target overlay location, determining that the match between the one or more obtained fingerprints and the fingerprint data associated with the known identity of the media content has ceased; and
in response to determining that the match between the one or more obtained fingerprints and the fingerprint data associated with the known identity of the media content has ceased, discontinuing the superimposing of the overlay content at the target overlay location.

12. The system of claim 11, wherein superimposing the overlay content at the target overlay location further comprises scaling the overlay content to fit the determined target overlay location.

13. The system of claim 11, wherein the operations further comprise:
identifying the overlay content based on the one or more obtained fingerprints, the identified overlay content corresponding to an overlay content fingerprint that matches a portion of the one or more obtained fingerprints.

14. The system of claim 11, wherein the overlay content is randomly selected from an overlay content database in communication with the data processing hardware of the media device.

15. The system of claim 11, wherein the operations further comprise:
based on the one or more obtained fingerprints, identifying an in-frame advertisement within the at least one frame,
wherein superimposing the overlay content at the target overlay location when the display of the media device displays the at least one frame comprises superimposing the overlay content at the target overlay location when the display of the media device displays the at least one frame with the in-frame advertisement.

16. The system of claim 15, wherein the in-frame advertisement comprises a background feature within the media content of the at least one frame.

17. The system of claim 15, wherein the in-frame advertisement corresponds to one or more of (i) a scene corresponding to more than one frame of media content or (ii) a potential in-frame advertisement placement position within a portion of the at least one frame.

18. The system of claim 17, wherein the operations further comprise identifying overlay content corresponding to an overlay scene, the overlay scene comprising a number of overlay content frames that matches a number of frames corresponding to the scene of the in-frame advertisement.

19. The system of claim 15, wherein the operations further comprise:
receiving an advertisement placement request, the advertisement placement request requesting an in-frame advertisement placement position and comprising overlay criteria;
identifying the target overlay location as the in-frame advertisement placement position; and
superimposing overlay content at the in-frame advertisement placement position that satisfies the overlay criteria of the advertisement placement request.

20. A non-transitory computer readable medium having stored thereon instructions that, upon execution by a processor, cause performance of a set of acts comprising:
receiving media content from a content feed;
displaying the media content from the content feed at a display of a media device;
determining a target overlay location within at least one frame;
determining that one or more fingerprints obtained from fingerprinting the at least one frame of the media content match fingerprint data associated with a known identity of the media content;
while the one or more obtained fingerprints are determined to be matching the fingerprint data associated with the known identity of the media content, superimposing overlay content at the target overlay location when the display of the media device displays the at least one frame;
during superimposing the overlay content at the target overlay location, determining that the match between the one or more obtained fingerprints and the fingerprint data associated with the known identity of the media content has ceased; and
in response to determining that the match between the one or more obtained fingerprints and the fingerprint data associated with the known identity of the media content has ceased, discontinuing the superimposing of the overlay content at the target overlay location.

* * * * *